Nov. 24, 1953  E. R. JACOBI  2,660,476
WHEEL
Filed Feb. 27, 1950  2 Sheets-Sheet 1

INVENTOR.
EMIL R. JACOBI
BY
ATTORNEYS

Nov. 24, 1953   E. R. JACOBI   2,660,476
WHEEL
Filed Feb. 27, 1950   2 Sheets-Sheet 2
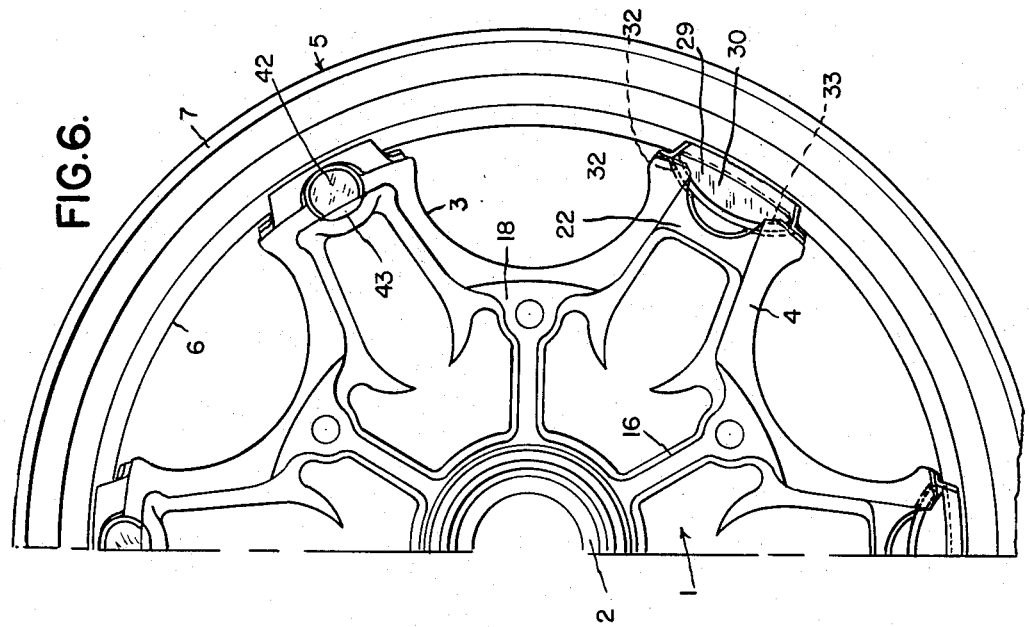
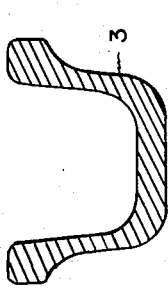
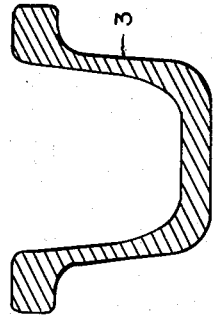
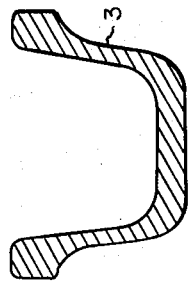
INVENTOR.
EMIL R. JACOBI
BY
ATTORNEYS Patented Nov. 24, 1953

2,660,476

UNITED STATES PATENT OFFICE 2,660,476

WHEEL

Emil R. Jacobi, Detroit, Mich., assignor to Kelsey-Hayes Wheel Company, Detroit, Mich., a corporation of Delaware Application February 27, 1950, Serial No. 146,555

3 Claims. (Cl. 301—12)

1

The invention relates to vehicle wheels and refers more particularly to wheels for busses, trucks, trailers, tractors and the like, having wheel bodies for demountably receiving tire carrying rims.

The invention has for one of its objects to provide an improved wheel body upon which the rim can be readily mounted and from which the rim can be readily demounted.

The invention has for another object to so construct the wheel body and the rim clamping means that the rim when mounted on the wheel body is properly aligned by being in substantially parallel relation to the path of rotation of the wheel body.

The invention has for a further object to so construct the wheel body and rim clamping means that the rim is concentric with the wheel body within the required tolerance limit.

The invention has for a still further object to provide a construction of wheel body facilitating its manufacture by forging or casting and also presenting a pleasing appearance.

With these and other objects in view the invention resides in the novel features of construction and combinations and arrangements of parts as more fully hereinafter set forth.

Figure 2:
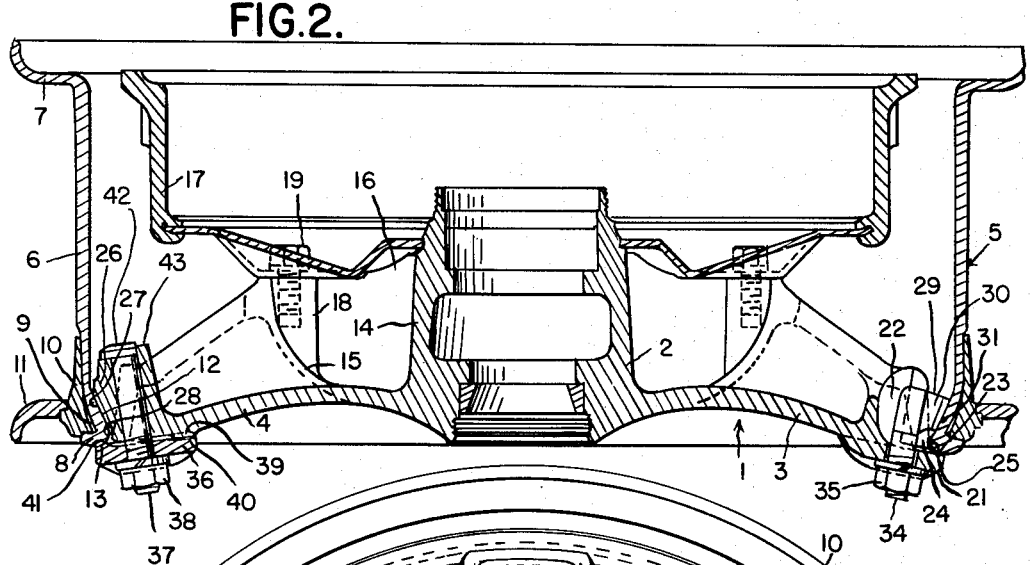
Figure 2 is a cross section on the line 2—2 of Figure 1.
Figure 1:
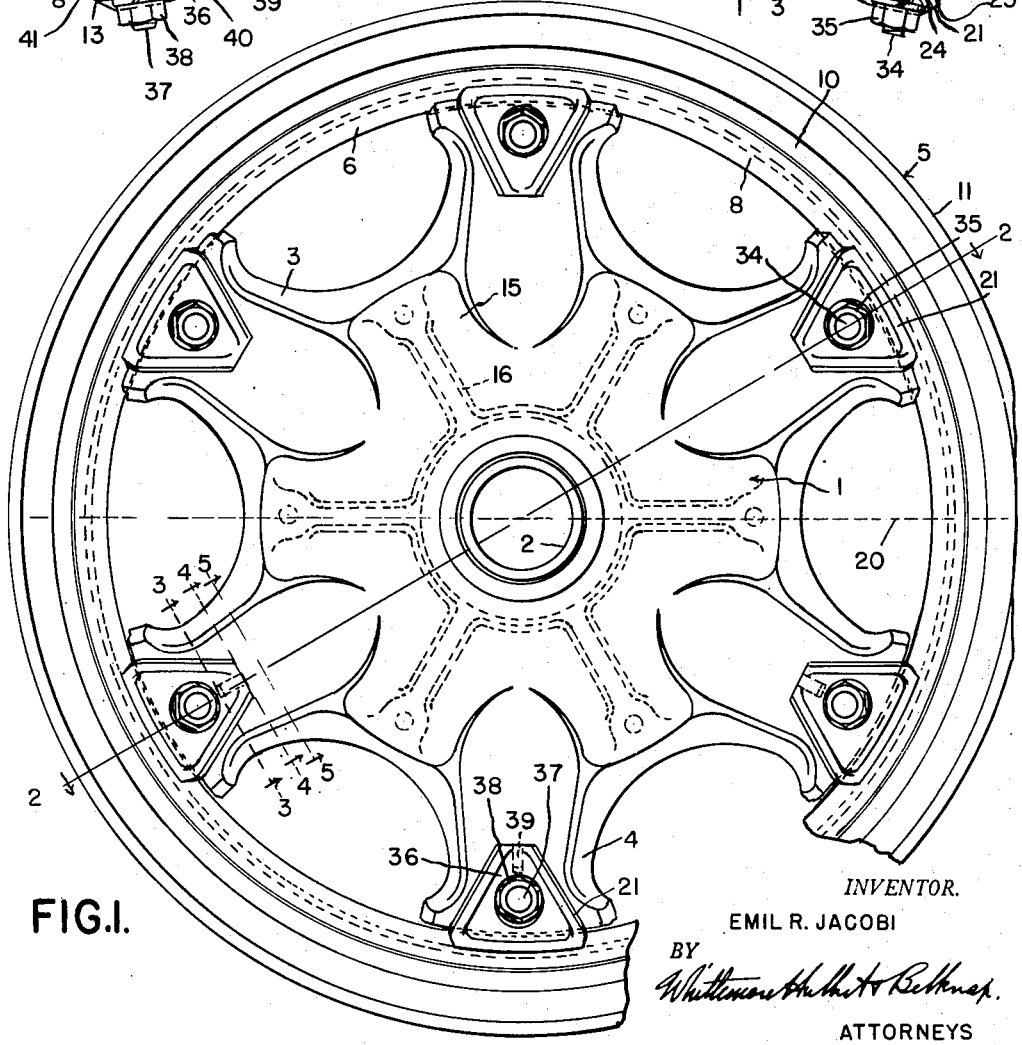
Figure 1 is an outboard elevation of a wheel embodying the invention.

Figures 3, 4 and 5 are cross sections respectively on the lines 3—3, 4—4 and 5—5 of Figure 2;

Figure 6 is an inboard elevation.

The wheel has the wheel body 1 comprising the hub 2 and the uniformly radiating spokes 3 and 4 at the radially outer ends of which the tire carrying rim 5 is detachably mounted. The rim has the endless annular base member 6 which is formed at one edge with the tire retaining flange 7 and at the other edge with the radially inwardly extending bead 8 having the annular outwardly opening groove or gutter 9 for receiving the detachable clamping ring 10 for the tire retaining flange 11. The bead has the generally axially extending frusto-conical side 12 and the generally radially extending side 13.

The hub 2 has the central bearing portion 14, the spoke joining portion 15 and the reinforcing ribs 16, the spoke joining portion flares axially inwardly or in an inboard direction from its junction with the bearing portion and its maximum diameter is the major portion of the diameter of the wheel body. The spokes 3 and 4 are of U-shaped cross section opening axially

2 inwardly or in an inboard direction and the bottom and side walls of the U of each spoke merge into the spoke joining portion. Moreover, the spokes and spoke joining portion at their junctions are axially substantially coextensive. The ribs 16 extend generally radially between and connect the bearing and spoke joining portions 14 and 15 respectively, the ribs being substantially midway between adjacent spokes. For the purpose of securing a brake drum 17 to the wheel body the reinforcing ribs are formed with the enlarged parts or bosses 18 at their radially outer edges to which the brake drum is anchored by suitable means such as the cap bolts 19 threaded into these parts or bosses. The parts or bosses merge into the parts of the spoke joining portion 15 between adjacent spokes.

The spokes 3 and 4 are arranged in two series on opposite sides of a diameter 20 (shown in dotted lines) of the wheel body and the radially outer ends of these spokes are constructed so that the rim may be easily buttoned on or unbuttoned from the radially outer ends. In detail, the spokes 3 are formed at their radially outer ends with the fixed integral abutments 21 and the generally radially outwardly opening recesses or pockets 22 located axially inwardly or inboard of the abutments. The abutments have the generally radial seats 23 facing axially inwardly or in an inboard direction for engaging the side 13 of the rim bead 8. The seats 23 are located in the same plane of rotation of the wheel body. The abutments are also provided with the generally axially extending surfaces 24 and with the arcuate surfaces 25 connecting the seats 23 and the surfaces 24. The surfaces 24 are concentric with the wheel body and serve as pilots engageable with the radially inner surface of the rim bead during the clamping of the rim upon the wheel body.

The spokes 4 are formed at their radially outer ends with the fixed integral abutments 26 having the generally axially extending frusto-conical seats 27 at the same angle of inclination as the side 12 of the rim bead. The seats 27 are concentric with the wheel body and are axially positioned with respect to the seats 23 within a limited tolerance to engage the side 12 of the rim bead when the side 13 of the rim bead engages the seats 23. The abutments 26 are also provided with the generally axially extending surfaces 28 located axially outwardly or in an outboard direction from the seats 27. The surfaces 28 are concentric with the wheel body and serve as pilots engageable with the radially inner surface of the bead 8 during the clamping of the rim upon the wheel body.

For fastening or securing the rim bead against the abutments 21 I have provided the clamps 29 at the radially outer ends of the spokes 3, each clamp having the generally T-shaped head 30 provided with the generally axially extending frusto-conical radially outer bearing surface 31 inclined at the same angle as the side 12 of the rim bead and engageable with this side. The head is also provided with the spaced radially inner bearing surfaces 32 for engaging corresponding surfaces 33 in the associated recess or pocket 15. The surfaces 33 are machined by a rotating cutter so that the surfaces have common centers. Each clamp is also formed with the shank 34 which extends axially outwardly or in an outboard direction through the abutment 21 and is threadedly engaged by the nut 35. To facilitate the clamping action, the surfaces 33 of the recesses or pockets 15 for engaging the bearing surfaces 32 and the shanks 34 are inclined radially inwardly and axially outwardly or in an outboard direction at an angle less than that of the side 12 of the rim bead.

For clamping or fastening the rim against the seats 27 of the fixed abutments 26, I have provided the clamps 36 and the bolts and nuts 37 and 38 respectively. The clamps are positioned by the bosses 39 formed upon the spokes 4 and engaging the radial slots 40 in the clamps. Further, the clamps have the generally radially extending bearing surfaces 41 at their radially outer ends for abutting the side 13 of the rim bead. The bolts 37 have their shanks inclined at the same angle as the shanks 34 and are provided with the heads 42 non-rotatably secured to the radially outer ends of the spokes by being formed with flat faces for engaging corresponding faces of the projections 43.

The above construction is such that the rim may be readily and easily buttoned on to the wheel body by first moving the rim over the fixed abutments 21 and then swinging the remainder of the rim into place after which the rim may be fastened by tightening up on the nuts 35 and 38. Also, the generally axially extending surfaces 24 and 28 of the fixed abutments serve as pilots during the clamping of the rim to maintain the rim concentric with the wheel body within the required tolerance limit. The construction is also such that the wheel body may be forged or cast and the brake drum may be readily attached to and mounted on the wheel body and the surfaces including the seats of the fixed abutments for engaging the rim may all be machined by the one form tool.

What I claim as my invention is:

1. A wheel comprising a wheel body for demountably receiving a tire carrying rim having a radially inwardly extending annular bead, said wheel body having a series of spokes provided at one side of said wheel body with fixed abutments formed with generally radial seats engageable with one side of the rim bead and a second series of spokes at the side of a diameter of the wheel body opposite said first mentioned series of spokes, said second series of spokes being provided at the same side of said wheel body as said first mentioned abutments with fixed abutments formed with axially inclined seats engageable with the opposite side of the rim bead, clamps provided with axially inclined bearing surfaces engageable with the last mentioned side of the rim bead, said clamps being mounted on said first mentioned series of spokes and being movable toward said generally radial seats to clamp the rim bead against the same, other clamps provided with generally radial bearing surfaces engageable with the first mentioned side of the rim bead, said last mentioned clamps being mounted on said second series of spokes and being movable toward said axially inclined seats to clamp the rim bead against the same, and threaded nuts located at the same side of said wheel body as said first mentioned abutments and engaging said first mentioned and last mentioned clamps for moving the same to clamping position.

2. A wheel comprising a wheel body for demountably receiving a tire carrying rim having a radially inwardly extending annular bead, said wheel body having at one side a fixed abutment formed with a generally radial seat engageable with one side of the rim bead and at the same side as said first mentioned abutment a fixed abutment at the side of a diameter of the wheel body opposite said first mentioned fixed abutment and formed with an axially inclined seat engageable with the opposite side of the rim bead, a clamp provided with an axially inclined bearing surface engageable with the last mentioned side of the rim bead, said clamp being movable toward said generally radial seat to clamp the rim bead against the same, a second clamp provided with a generally radial bearing surface engageable with the first mentioned side of the rim bead, said second clamp being movable toward said axially inclined seat to clamp the rim bead against the same, and rotatable clamp actuating means located at one side of said wheel body and operatively connected to said first mentioned and second clamps for moving the same to clamping position.

3. A wheel comprising a wheel body for demountably receiving a tire carrying rim having a radially inwardly extending annular bead, said wheel body being provided with angularly spaced fixed abutment means, one abutment means being formed with generally radial seats engageable with one side of the rim bead and another abutment means being formed with axially inclined seats engageable with the other side of the rim bead, said first mentioned and second mentioned abutment means being at opposite sides of a diameter of the wheel body providing for buttoning on of the rim, clamp means provided with axially inclined bearing surfaces engageable with the last mentioned side of the rim bead and movable to clamp the rim bead against the generally radial seats of said first mentioned abutment means, second clamp means provided with generally radial bearing surfaces engageable with the first mentioned side of the rim bead and movable to clamp the rim bead against the axially inclined seats of said second mentioned abutment means, and movable members located at one side of said wheel body and operatively connected to said first mentioned and second clamp means for moving the same to clamping position.

EMIL R. JACOBI.

References Cited in the file of this patent
UNITED STATES PATENTS

| Number | Name | Date |
|---|---|---|
| 1,924,385 | Vandeveer | Aug. 29, 1933 |
| 2,008,728 | Sauzedde | July 23, 1935 |
| 2,117,927 | Walther | May 17, 1938 |
| 2,135,481 | Brink | Nov. 8, 1938 |
| 2,217,867 | Knoth | Oct. 15, 1940 |